United States Patent
Dlugoss (10) Patent No.: US 8,108,096 B2
(45) Date of Patent: Jan. 31, 2012

(54) DIAGNOSTIC SYSTEMS AND METHODS FOR A TORQUE SENSOR

(75) Inventor: Randall B. Dlugoss, Royal Oak, MI (US)

(73) Assignee: GM Global Technology Operations LLC

( * ) Notice: Subject to any disclaimer, the term of this patent is extended or adjusted under 35 U.S.C. 154(b) by 259 days.

(21) Appl. No.: 12/548,042

(22) Filed: Aug. 26, 2009

(65) Prior Publication Data
US 2010/0222961 A1 Sep. 2, 2010

Related U.S. Application Data

(60) Provisional application No. 61/156,180, filed on Feb. 27, 2009.

(51) Int. Cl.
G06F 7/00 (2006.01)
G01S 1/00 (2006.01)
G01M 15/00 (2006.01)

(52) U.S. Cl. ............ 701/34; 701/32; 701/101; 702/41; 702/104; 477/906

(58) Field of Classification Search ............ 701/34, 701/32, 101; 702/41, 104; 477/906; 123/406.23, 123/352, 350
See application file for complete search history.

(56) References Cited

U.S. PATENT DOCUMENTS

| | | | |
|---|---|---|---|
| 5,938,712 A * | 8/1999 | Ibamoto et al. | 701/54 |
| 6,397,152 B1 * | 5/2002 | Kalweit et al. | 702/41 |
| 6,553,958 B1 * | 4/2003 | Kolmanovsky et al. | 123/295 |
| 7,111,611 B1 * | 9/2006 | Lyon | 123/399 |
| 7,593,796 B2 * | 9/2009 | Prokhorov | 701/29 |
| 7,635,317 B2 * | 12/2009 | Petzold et al. | 477/115 |
| 2005/0176543 A1 * | 8/2005 | Kirkwood et al. | 475/5 |
| 2006/0142924 A1 * | 6/2006 | Nakagawa et al. | 701/110 |
| 2006/0154783 A1 * | 7/2006 | Petzold et al. | 477/107 |
| 2006/0199697 A1 * | 9/2006 | Kirkwood et al. | 477/5 |
| 2008/0125929 A1 * | 5/2008 | Prokhorov | 701/29 |
| 2010/0161197 A1 * | 6/2010 | Moeckly et al. | 701/99 |

OTHER PUBLICATIONS

U.S. Appl. No. 12/548014, filed Aug. 26, 2009, Randall B. Dlugoss.

* cited by examiner

Primary Examiner — Ronnie Mancho (57) ABSTRACT

A system for a vehicle includes an engine torque module, a torque detection module, a torque estimation module, a torque monitoring module, and a diagnostic module. The engine torque module generates a first estimated torque signal based on engine signals and/or GPS signals. The torque detection module generates an actual torque signal of a transmission. The torque estimation module generates a second estimated torque signal based on the first estimated torque signal and/or vehicle/engine values. The diagnostic module detects a fault of a torque sensor based on a torque difference between the actual torque signal and the second estimated torque signal. The torque monitoring module generates a first and a second torque signals based on actual torque signals that represent a lowest and a highest torque values respectively over a predetermined period. The diagnostic module detects the fault based on a torque difference the first and the second torque signals.

20 Claims, 8 Drawing Sheets

DIAGNOSTIC SYSTEMS AND METHODS FOR A TORQUE SENSOR

CROSS-REFERENCE TO RELATED APPLICATIONS

This application claims the benefit of U.S. Provisional Application No. 61/156,180, filed on Feb. 27, 2009. This application is related to U.S. patent application Ser. No. 12/548,014 filed on Aug. 26, 2009. The disclosures of the above applications are incorporated herein by reference in their entirety.

FIELD

The present disclosure relates to vehicle diagnostic systems, and more particularly to diagnostic systems for operation of a torque sensor.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A drivetrain for a vehicle may include an internal combustion engine that generates drive torque. Air is drawn into a cylinder of the engine and mixed with fuel to form a combustion mixture. The combustion mixture is compressed within the cylinder and is combusted to drive a piston within the cylinder. Reciprocating motion of the piston rotates a crankshaft of the engine to produce drive torque, which may be detected by a torque sensor.

Torque sensors may be used for numerous applications in a vehicle, such as to measure a drive and brake torque and a steering-wheel torque. The torque sensors may measure rotational torque. For example, an engine crankshaft or a transmission axle may produce a rotational output torque, which may be detected by respective torque sensors. Outputs of the torque sensors may be used for engine and/or transmission control.

SUMMARY

In one embodiment, a system is provided that includes an engine torque module that generates a first estimated torque signal. The first estimated torque signal is generated based on a mass airflow signal, a fuel amount delivered to cylinders of an engine, and an engine speed. A torque detection module generates an actual torque signal based on a torque signal received from a torque sensor that indicates an actual output torque of a transmission. A torque estimation module generates a second estimated torque signal. The second estimated torque signal is generated independent of the actual torque signal and based on the first estimated torque signal, a transmission gain value, a transmission loss value, and a transmission offset value. A diagnostic module detects a fault of the torque sensor based on a torque difference between the actual torque signal and the second estimated torque signal.

In other features, a system is provided that includes an engine torque module that generates a first estimated torque signal. The first estimated torque signal is generated based on a global positioning system (GPS) vehicle speed signal, a throttle signal, and a gear ratio of a transmission. A torque detection module generates an actual torque signal. The actual torque signal is generated based on a torque signal received from a torque sensor that indicates an actual output torque of a transmission. A torque estimation module generates a second estimated torque signal. The second estimated torque signal is generated independent of the actual torque signal and based on the first estimated torque signal and an estimated vehicle mass value. A diagnostic module detects a fault of the torque sensor based on a torque difference between the actual torque signal and the second estimated torque signal.

In other features, a system is provided that includes a torque detection module that generates an actual torque signal. The actual torque signal is generated based on a torque signal received from a torque sensor that indicates an actual output torque of a transmission. A torque monitoring module generates a first torque signal. The first torque signal is generated based on the actual torque signal that represents a lowest torque value over a predetermined period. The torque monitoring module generates a second torque signal. The second torque signal is generated based on the actual torque signal that represents a highest torque value over the predetermined period. A diagnostic module detects a fault of the torque sensor based on a minimum expected noise value and a torque difference between the first torque signal and the second torque signal.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

In addition, although the following embodiments are described primarily with respect to a spark ignition direct injection (SIDI) engine, the embodiments of the present disclosure may apply to other types of engines. For example, the present invention may apply to compression ignition, spark ignition, spark ignition direct injection, homogenous spark ignition, homogeneous charge compression ignition, stratified spark ignition, diesel, and spark assisted compression ignition engines.

An engine of a vehicle may be operated in a transient mode or a non-transient mode. A transient mode may refer to a gear shift, inconsistent vehicle acceleration or deceleration, and/or braking in absence of a valid diagnostic trouble code (DTC) for particular vehicle sensors. The vehicle sensors may include, but are not limited to, a throttle position sensor, a mass airflow (MAF) sensor, a crankshaft sensor, a torque sensor, a fuel sensor, a brake sensor, and an intake air temperature sensor.

A non-transient mode may refer to when no gear shift is occurring, consistent vehicle acceleration or deceleration exist, a braking operation is not being performed, and/or absence of a valid DTC for particular vehicle sensors. The non-transient mode further indicates that an engine torque change during a diagnostic period is less than a predetermined value. The embodiments of the present disclosure provide torque sensor diagnostic systems for detecting a fault of a torque sensor during a transient mode and/or a non-transient mode.

Figure 1:
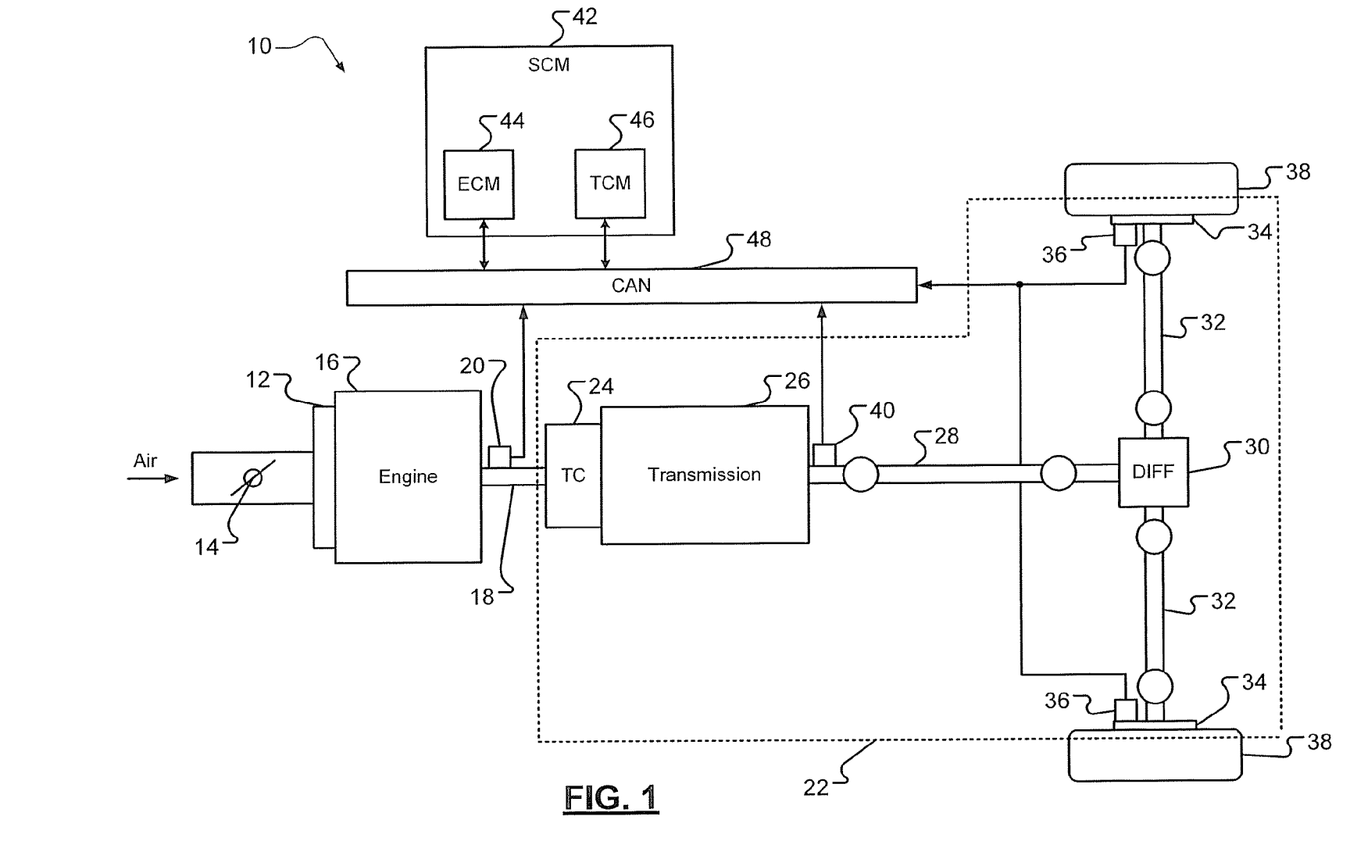
FIG. 1 is a functional block diagram of an engine system in accordance with an embodiment of the present disclosure.

Referring now to FIG. 1, an engine system 10 of a vehicle is schematically illustrated in accordance with the present disclosure. Although the engine system 10 is illustrated as a rear wheel drive (RWD) engine, the present disclosure applies to other drive configurations. Air is drawn into an intake manifold 12 through a throttle valve 14. Air within the intake manifold 12 is mixed with fuel and distributed into cylinders (not shown) of an engine 16. The cylinders drive a crankshaft 18 of the engine 16 to produce drive torque. The crankshaft 18 rotates at engine speed or a rate that is proportional to the engine speed. A crankshaft sensor 20 senses a position of the crankshaft 18 and generates a crankshaft position (CSP) signal. The CSP signal may be related to the rotational speed of the crankshaft 18 and cylinder events.

The engine system 10 may include a drivetrain system 22. The crankshaft 18 of the engine 16 drives the drivetrain system 22. The drivetrain system 22 includes a flexplate or flywheel (not shown), a torque converter or other coupling device 24, a transmission 26, a drive shaft 28, a differential 30, axle shafts 32, brakes 34, brake sensors 36, and driven wheels 38. Propulsion torque that is output at the crankshaft 18 of the engine 16 is transferred through the drivetrain system components to provide axle torque at the axle shafts 32 to drive the wheels 38. More specifically, the propulsion torque is multiplied by several gear ratios provided by the torque converter 24, the transmission 26 and the differential 30. The propulsion torque may indicate axle torque at the axle shafts 32. A torque sensor 40 may be located and measure output torque of the transmission 26 to generate a torque signal. Additional torque sensors may also be included.

The engine system 10 may also include a system control module (SCM) 42, which regulates operation of the engine system 10. The SCM 42 includes an engine control module (ECM) 44 and a transmission control module (TCM) 46. The engine system 10 including, but not limited to, the ECM 44 and the TCM 46, may be in communication with a controller area network (CAN) or other serial bus system 48 for communicating with various components and sensors within the vehicle.

Figure 2:
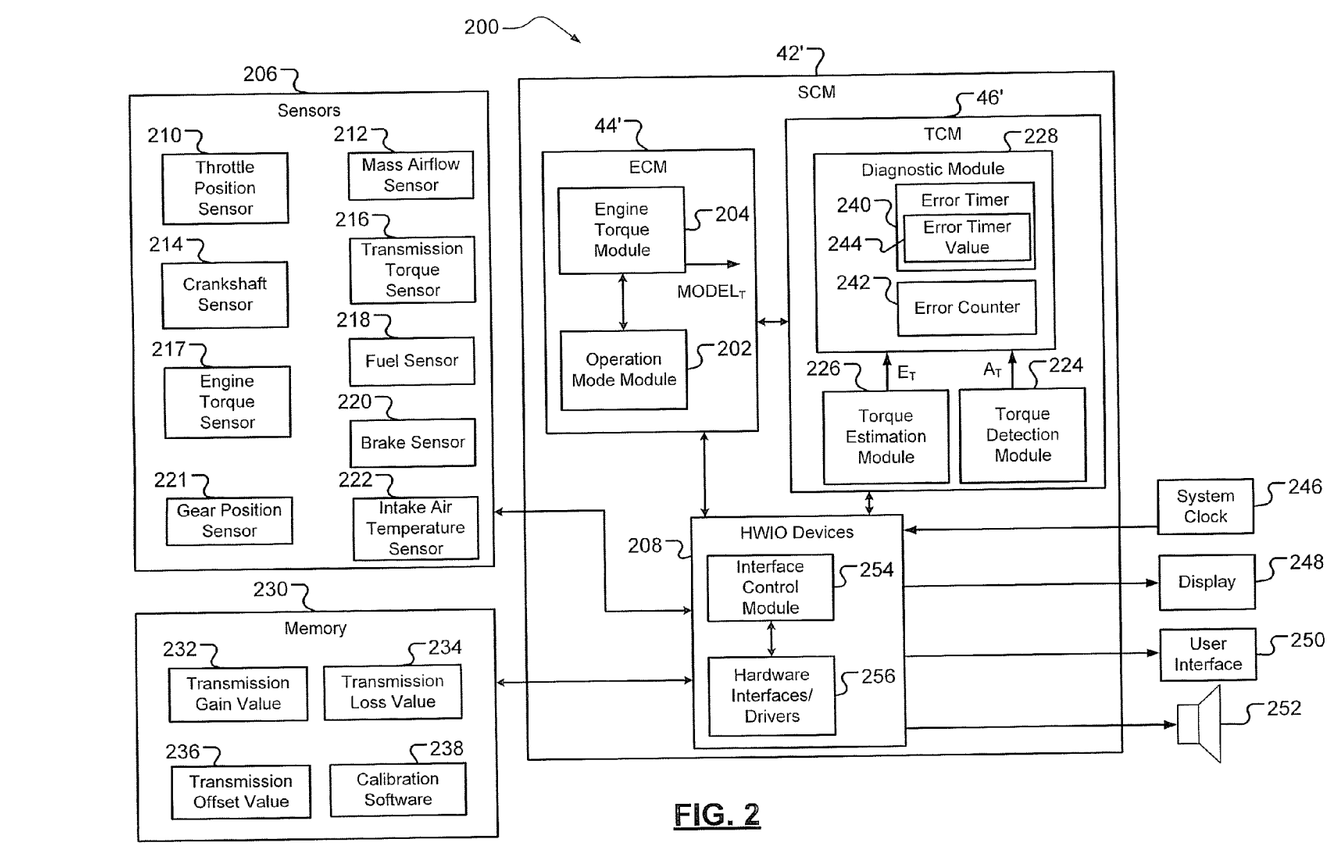
FIG. 2 is a functional block diagram of a torque sensor diagnostic system that uses a model method in accordance with an embodiment of the present disclosure.

Referring now also to FIG. 2, a torque sensor diagnostic system 200 that uses a model method is shown. The torque sensor diagnostic system 200 includes a SCM 42'. The SCM 42' may be used in replacement of the SCM 42 of FIG. 1 and include an ECM 44' and a TCM 46'.

The ECM 44' includes an operation mode module 202 and an engine torque module 204. The operation mode module 202 receives signals from sensors 206 via hardware input/output (HWIO) devices 208. The sensors 206 may include, but are not limited to, a throttle position sensor 210, a mass airflow (MAF) sensor 212, a crankshaft sensor 214, a transmission torque sensor 216, an engine torque sensor 217, a fuel sensor 218, a brake sensor 220, a gear position sensor 221, and an intake air temperature sensor 222. The operation mode module 202 communicates with the sensors 206 and determines whether the engine 16 is in a non-transient mode. The non-transient mode may be determined based on at least one of a gear position signal, a brake signal, an engine speed, and an engine torque change during a predetermined period.

When the engine 16 is in the non-transient mode, the operation mode module 202 may generate an enablement signal and transmit the enablement signal to the engine torque module 204. When the engine torque module 204 receives the enablement signal, the engine torque module 204 generates a first estimated torque signal $MODEL_T$ based on a MAF signal, a fuel amount delivered to cylinders of an engine, and an engine speed. The engine torque module 204 transmits the first estimated torque signal $MODEL_T$ to the TCM 46'.

The TCM 46' includes a torque detection module 224, a torque estimation module 226, and a diagnostic module 228. The torque detection module 224 may generate an actual torque signal $A_T$ based on a torque signal received from the transmission torque sensor 216. The torque detection module 224 may transmit the actual torque signal $A_T$ to the diagnostic module 228. When the diagnostic module 228 receives the actual torque signal $A_T$, the diagnostic module 228 enables the torque estimation module 226.

The torque estimation module 226 receives the first estimated torque signal $MODEL_T$ from the engine torque module 204 and generates a second estimated torque signal $E_T$. The second estimated torque signal $E_T$ is generated based on the first estimated torque signal $MODEL_T$ and one or more stored vehicle and/or engine status values. The vehicle and/or engine status values may be stored in memory 230 and may include a transmission gain value GAIN 232, a transmission loss value LOSS 234, and a transmission offset value OFFSET 236. The vehicle and/or engine status values may be determined by the torque estimation module 226 using calibration software 238.

The transmission gain value GAIN 232 may be determined based on at least one of a gear ratio and a torque converter multiplication value. The transmission loss value LOSS 234 may be determined based on at least one of a clutch loss value and a pump loss value. The transmission offset value OFFSET 236 may be determined based on at least one of a voltage and current variation of the torque sensor 40, an amount of magnetic leakage of the torque sensor 40, and sensor and/or instrumentation noise. The torque estimation module 226 transmits the second estimated torque signal $E_T$ to the diagnostic module 228.

The diagnostic module 228 includes an error timer 240 and an error counter 242. The diagnostic module 228 compares the second estimated torque signal $E_T$ with the actual torque signal $A_T$. When the difference between the torque signals $E_T$, $A_T$ is greater than a predetermined value, the diagnostic module 228 increments an error timer value 244 of the error timer 240. The error timer 240 accesses a system clock 246 via the HWIO devices 208 to receive an initial timestamp of, for example, when the difference between the torque signals $E_T$, $A_T$ is greater than a predetermined value. The error timer 240 compares the initial timestamp with a current timestamp, which may also be received from the system clock 246.

The diagnostic module 228 increases the error timer value 244 based on the difference between the timestamps. When the error timer value 244 is greater than a predetermined period, the error counter 242 may be incremented by one based on the error timer value 244. The diagnostic module 228 continues to receive the second estimated torque signal $E_T$ and the actual torque signal $A_T$ during the non-transient mode. When the error counter 242 is greater than a predetermined value, the diagnostic module 228 generates and transmits an error code signal to the HWIO devices 208 to activate at least one of a display 248, a user interface 250, and an audible device 252.

The HWIO devices 208 may include an interface control module 254 and hardware interfaces/drivers 256. The interface control module 254 provides an interface between the ECM 44', the TCM 46', the sensors 206, the memory 230, and the hardware interfaces/drivers 256. The hardware interfaces/drivers 256 control operation of, for example, the system clock 246, the display 248, the user interface 250, the audible device 252, and other vehicle and/or engine system devices. The other vehicle and/or engine system devices may include, but are not limited to, ignition coils, spark plugs, throttle valves, solenoids, etc. The hardware interface/drivers 256 also receive sensor signals, which are communicated to the respective modules, such as the ECM 44' and the TCM 46'.

Figure 3:
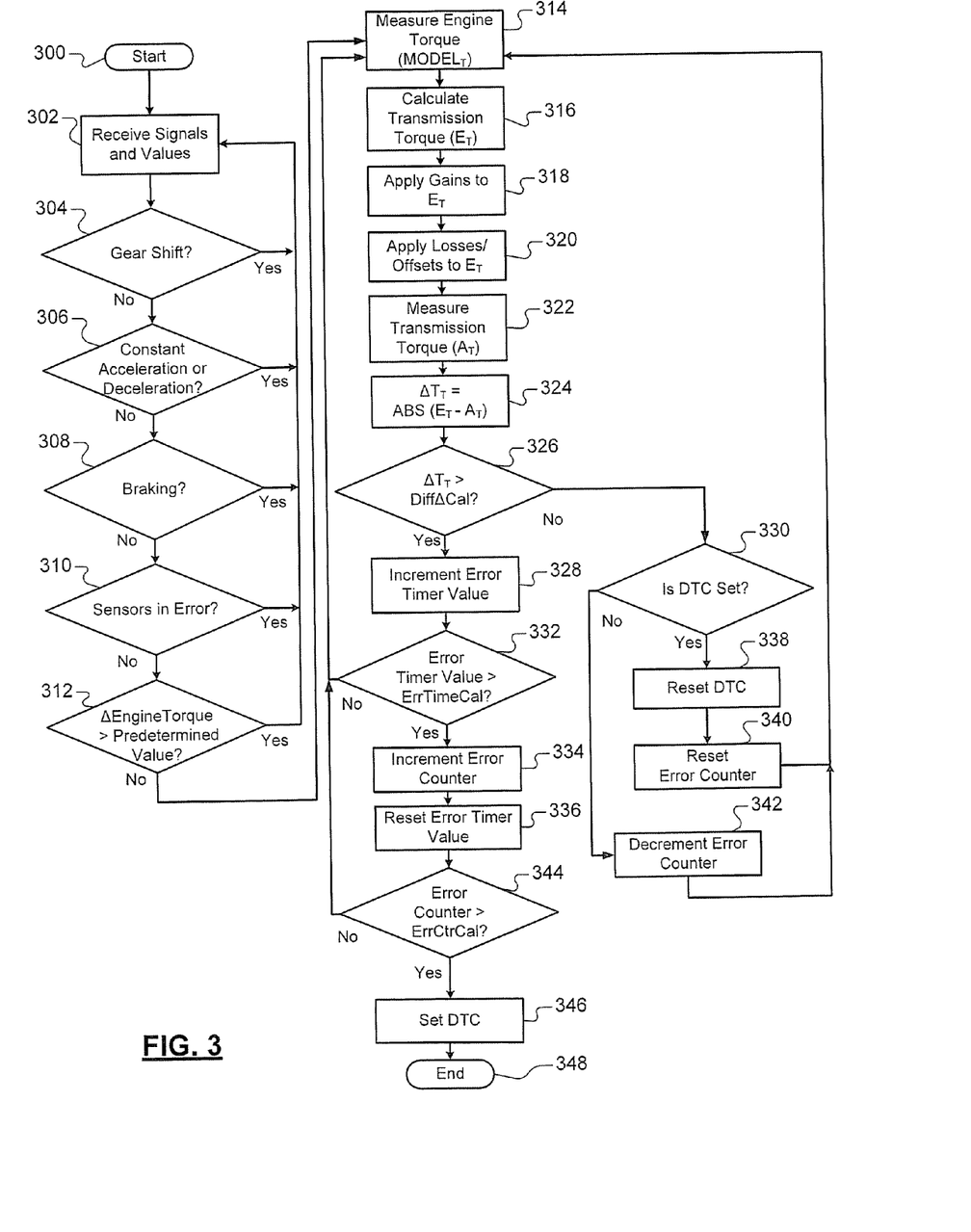
FIG. 3 illustrates a torque sensor diagnostic method that uses a model method in accordance with an embodiment of the present disclosure.

Referring now also to FIG. 3, a torque sensor diagnostic method that uses a model method is shown. Although the following steps are primarily described with respect to the embodiments of FIGS. 1-2, the steps may be modified to apply to other embodiments of the present invention.

The method may begin at step 300. In step 302, signals from the sensors 206 may be received and/or generated. The signals may be transmitted to the operation mode module 202 via the HWIO devices 208. The operation mode module 202 determines whether the engine system 10 is operating in one of a transient mode and a non-transient mode based on the signals. The signals may include a gear position signal, a brake signal, an engine speed, a DTC signal, and an engine torque change during a predetermined period.

For example, the engine 16 is operating in a non-transient mode when the following conditions are met: A) the transmission 26 is not in transition of shifting gears, B) the engine 16 is accelerating or decelerating at a constant rate, or an engine speed is consistent, C) the brake sensor 220 indicates that vehicle braking is not applied, D) the engine torque change is less than a predetermined value over a predetermined period, and E) the engine system 10 produces no DTC signals for the sensors 206.

In step 304, when the gear position signal indicates that the transmission 26 is not shifting between two or more gears for a predetermined period, control may proceed to step 306. Otherwise, control may return to step 302. In step 306, when the throttle signal indicates at least one of constant velocity and a consistent acceleration and/or deceleration of a vehicle, control may proceed to step 308. Otherwise, control may return to step 302.

In step 308, when the brake signal indicates that vehicle braking is not applied, control may proceed to step 310. Otherwise, control may return to step 302. In step 310, when the DTC signal indicates that one of the sensors 206 is faulty, control may return to step 302. Otherwise, control may proceed to step 312.

In step 312, when the engine torque change ΔEngineTorque during a predetermined period is greater than a predetermined value, control may return to step 302. Otherwise, control may proceed to step 314. For example, the operation mode module 202 may receive engine torque signals from the engine torque sensor 217 over a predetermined period. Fluctuations may occur in the engine torque signals during the predetermined period due to abrupt throttling or braking. If the engine torque signals indicate a torque variance that is less than a predetermined value, the engine 16 may be operating in a non-transient mode. Alternatively, the operation mode module 202 may receive estimated engine torque signals from the engine torque module 204 based on a mass airflow signal, a fuel amount delivered to cylinders of an engine, and an engine speed. If the estimated engine torque signals indicate a torque variance that is less than a predetermined value, the engine 16 may be operating in a non-transient mode.

In step 314, the operation mode module 202 may generate and transmit an enablement signal to the engine torque module 204. The engine torque module 204 receives the enablement signal and generates a first estimated torque signal $MODEL_T$ based on a mass airflow signal, a fuel amount delivered to cylinders of an engine, and an engine speed. The first estimated torque signal $MODEL_T$ is transmitted to the torque estimation module 226.

In step 316, the torque estimation module 226 receives the first estimated torque signal $MODEL_T$ from the engine torque module 204 and generates a second estimated torque signal $E_T$. For example only, the second estimated torque signal $E_T$ may be defined as provided by expression 1.

$$E_T = (MODEL_T \times GAIN) - LOSS - OFFSET \qquad (1)$$

In step 318, the torque estimation module 226 generates a first transmission gain value GAIN 232. The torque estimation module 226 receives a gear position signal from the gear position sensor 221 and determines a gear ratio. The transmission gain value GAIN 232 is determined based on the gear ratio. The transmission gain value GAIN 232 may be set equal to the gear ratio. The first estimated torque signal $MODEL_T$ is multiplied by the gear ratio or the first transmission gain value GAIN 232 to estimate the output torque of the transmission.

Similarly, the torque estimation module 226 generates a second transmission gain value GAIN 232. A torque converter multiplication value TCMV may be equal to a torque ratio of output torque versus input torque of the torque converter 24. Alternatively, the torque converter multiplication value TCMV may be defined as provided by expression 2.

$$TCMV = \sqrt{RPM/K} \qquad (2)$$

RPM represents revolutions per minute of an engine, and K may be defined as provided by expression 3.

$$K = RPM/\sqrt{Tq} \qquad (3)$$

Tq represents at least one of engine torque and transmission torque. The second transmission gain value GAIN 232 may be set equal to the TCMV. The first estimated torque signal $MODEL_T$ is further multiplied by the torque converter multiplication value TCMV or the second transmission gain value GAIN 232 to estimate the output torque of the transmission.

In step 320, the torque estimation module 226 generates the transmission loss value LOSS 234. The transmission loss values may be equal to at least one of a clutch loss value and a pump loss value. The clutch loss value is determined based on at least one of a spinning speed of a clutch, a type of the clutch, and a pressure of the clutch. The clutch loss value may indicate a frictional loss from bearings and bushings associated with the torque sensor 40 and a side loading of the drive shaft 28. The pump loss value is determined based on a frictional loss from the pumping of fluid in the torque converter 24.

For example only, the pump loss value PL may be defined as provided by expression 4.

$$PL = F\{RPM, L, GP\} \quad (4)$$

RPM is engine speed. L is engine load and may be determined based on a mass air flow (MAF) signal. GP is gear position and may correspond to a position of a gear or a selected gear. The clutch loss value and the pump loss value are subtracted from the second estimated torque signal $E_T$ to provide a decreased torque value due to torque losses in the torque sensor 40.

Similarly, the torque estimation module 226 generates the transmission offset value OFFSET 236. The torque estimation module 226 may determine a voltage and current variation of the torque sensor 40, an amount of magnetic leakage of the torque sensor 40, and sensor and/or instrumentation noise. The voltage and current variation, the magnetic leakage, sensor noise and instrumentation noise are also subtracted from the second estimated torque signal $E_T$ to provide a decreased torque value due to torque offsets in the torque sensor 40.

In step 322, the torque detection module 224 generates an actual torque signal $A_T$. The torque detection module 224 receives a torque signal from the transmission torque sensor 216 via hardware input/output (HWIO) devices 208 to generate an actual torque signal $A_T$.

In step 324, the diagnostic module 228 compares the second estimated torque signal $E_T$ with the actual torque signal $A_T$. The diagnostic module 228 calculates a torque difference between the second estimated torque signal and the actual torque signal. An absolute value of the torque difference is set as $\Delta T_T$.

In step 326, when the torque difference $\Delta T_T$ is greater than a predetermined value DiffΔCal, control may proceed to step 328 indicating a malfunction of the torque sensor 40. Otherwise, control may proceed to step 330. The predetermined value may, for example, be calibrated and set using the calibration software 238 in the memory 230. The predetermined value DiffΔCal indicates a maximum allowable torque difference between the second estimated torque signal $E_T$ and the actual torque signal $A_T$.

In step 328, the diagnostic module 228 may increase time lasted since the torque difference $\Delta T_T$ is greater than the predetermined value DiffΔCal. For example, the error timer 240 accesses a system clock 246 via the $\Delta T_T$ devices 208 to receive an initial timestamp of when the torque difference $\Delta T_T$ is greater than the predetermined value DiffΔCal. The error timer 240 compares the initial timestamp with a current timestamp, which may also be received from the system clock 246. The difference between the timestamps may be the error timer value 244.

In step 332, when the error timer value 244 is greater than a predetermined period ErrTimeCal, control may proceed to step 334. Otherwise, control may proceed to step 314. The predetermined value may, for example, be calibrated and set using the calibration software 238 in the memory 230. The predetermined value ErrTimeCal indicates a maximum allowable error time during which the torque difference that is greater than the predetermined value DiffΔCal continues. In step 334, the diagnostic module 228 increments an error counter 242 by one. In step 336, the error timer 240 resets the error timer value 244 to zero.

In step 330, when a DTC indicating a fault of the torque sensor 40 is previously set, control may proceed to step 338. Otherwise, control may proceed to step 342. In step 338, the diagnostic module 228 resets the DTC. In step 340, the diagnostic module 228 resets the error counter 242 to zero. In step 342, the diagnostic module 228 decrements the error counter 242 by one.

In step 344, when the error counter 242 is greater than a predetermined value ErrCtrCal, control may proceed to step 346. Otherwise, control may proceed to step 314. The predetermined value may, for example, be calibrated and set using the calibration software 238 in the memory 230. The predetermined value ErrCtrCal indicates a maximum allowable number of errors. In step 346, the diagnostic module 228 sets the DTC. Control may end at step 348.

Figure 4:
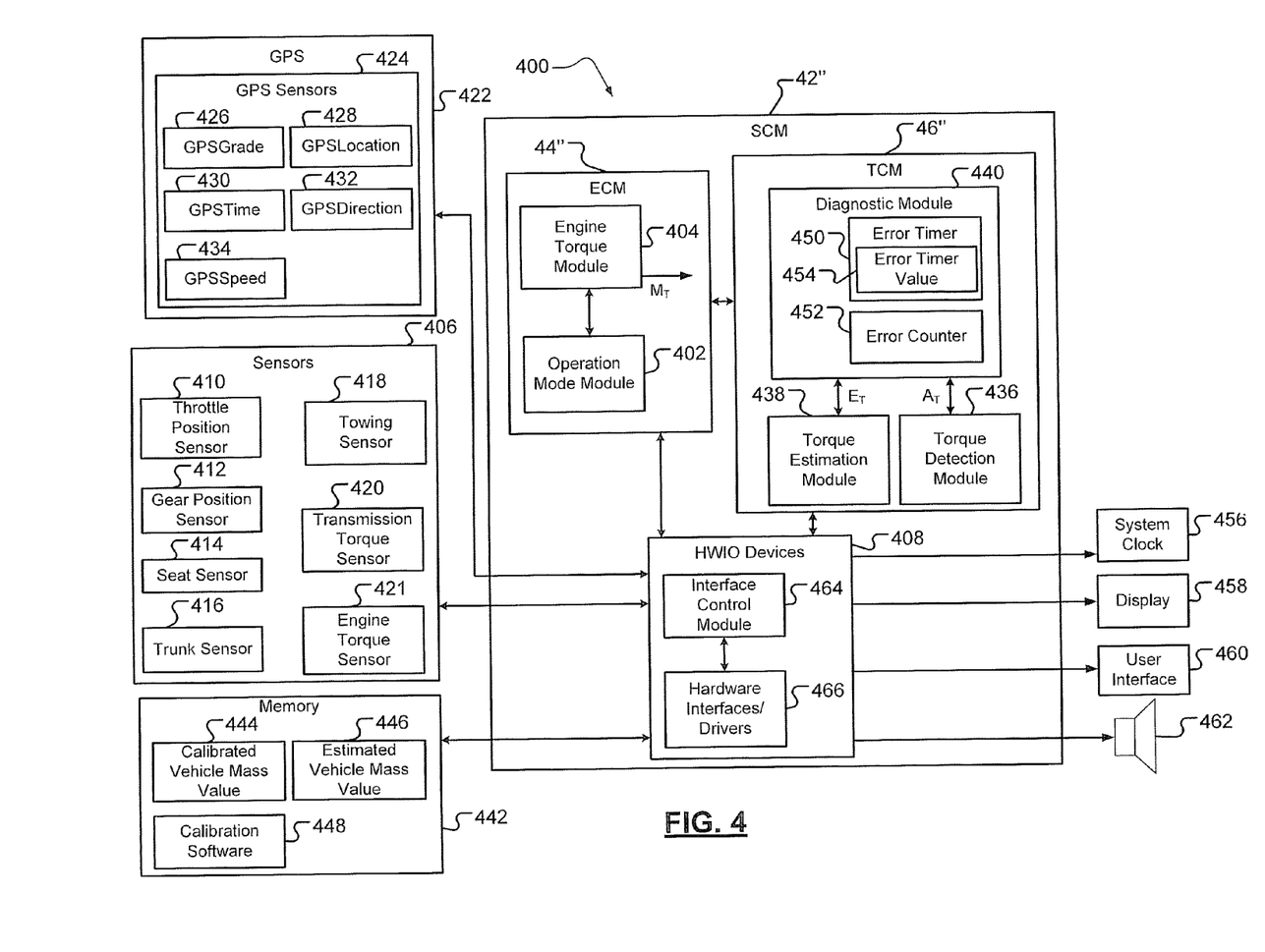
FIG. 4 is a functional block diagram of a torque sensor diagnostic system that uses a global positioning system (GPS) method in accordance with another embodiment of the present disclosure.

Referring now also to FIG. 4, a torque sensor diagnostic system 400 that uses a global positioning system (GPS) method is shown. The torque sensor diagnostic system 400 includes a SCM 42". The SCM 42" may be used in replacement of the SCM 42 of FIG. 1 and include an ECM 44" and a TCM 46".

In a similar manner to that described above in FIG. 2, the ECM 44" includes an operation mode module 402 and an engine torque module 404. The operation mode module 402 receives signals from sensors 406 via hardware input/output (HWIO) devices 408. The sensors 406 may include sensors shown in FIG. 2, such as a throttle position sensor 210, a mass airflow (MAF) sensor 212, a crankshaft sensor 214, a fuel sensor 218, a brake sensor 220, a gear position sensor 221, and an intake air temperature sensor 222. The sensors 406 may additionally include, but are not limited to, a throttle position sensor 410, a gear position sensor 412, a seat sensor 414, a trunk sensor 416, a towing sensor 418, and a transmission torque sensor 420. The operation mode module 402 communicates with the sensors 406 and determines whether the engine 16 is operating in a non-transient mode. The non-transient mode may be determined based on at least one of a gear position signal, a brake signal, an engine speed, and an engine torque change during a predetermined period.

When the engine 16 is in the non-transient mode, the operation mode module 402 may generate an enablement signal and transmit the enablement signal to the engine torque module 404. When the engine torque module 404 receives the enablement signal, the engine torque module 404 communicates with a GPS 422 and receives signals from GPS sensors 424. The GPS sensors may include, but are not limited to, a GPS grade sensor 426, a GPS location sensor 428, a GPS time sensor 430, a GPS direction sensor 432, and a GPS speed sensor 434.

The engine torque module 404 may generate a first estimated torque signal $M_T$ based on a GPS vehicle speed signal, a throttle signal, and a gear ratio of a transmission. The GPS vehicle speed signal may be generated based on at least one of a GPS grade signal, a GPS location signal, a GPS time signal, and a GPS direction signal. The engine torque module 404 transmits the first estimated torque signal $M_T$ to the TCM 46".

The TCM 46" includes a torque detection module 436, a torque estimation module 438, and a diagnostic module 440. The torque detection module 436 may generate an actual torque signal $A_T$ based on a torque signal received from the transmission torque sensor 420. The torque detection module 436 may transmit the actual torque signal $A_T$ to the diagnostic module 440. When the diagnostic module 440 receives the actual torque signal $A_T$, the diagnostic module 440 enables the torque estimation module 438.

The torque estimation module 438 receives the first estimated torque signal $M_T$ from the engine torque module 404 and generates a second estimated torque signal $E_T$. The second estimated torque signal $E_T$ is generated based on the first estimated torque signal $M_T$ and one or more stored vehicle and/or engine status values. The vehicle and/or engine status values may be stored in memory 442 and may include a calibrated vehicle mass value 444 and an estimated vehicle mass value 446. The calibrated vehicle mass value 444 may be determined by the torque estimation module 438 using calibration software 448. The torque estimation module 438 may determine the estimated vehicle mass value 446 based on at least one of the seat sensor 414, the trunk sensor 416, the towing sensor 418, and the calibrated vehicle mass value 444.

The torque estimation module 438 transmits the second estimated torque signal $E_T$ to the diagnostic module 440. The diagnostic module 440 includes an error timer 450 and an error counter 452. The diagnostic module 440 compares the second estimated torque signal $E_T$ with the actual torque signal $A_T$. When the difference between the signals is greater than a predetermined value, the diagnostic module 440 increments an error timer value 454 of the error timer 450. The error timer 450 accesses a system clock 456 via the HWIO devices 408 to receive an initial timestamp of, for example, when the difference between the signals is greater than a predetermined value. The error timer 450 compares the initial timestamp with a current timestamp, which may also be received from the system clock 456.

The diagnostic module 440 increases the error timer value 454 based on the difference between the timestamps. When the error timer value 454 is greater than a predetermined period, the error counter 452 may be incremented by one based on the error timer value 454. The diagnostic module 440 continues to receive the second estimated torque signal $E_T$ and the actual torque signal $A_T$ during the non-transient mode. When the error counter 452 is greater than a predetermined value, the diagnostic module 440 generates and transmits an error code signal to the HWIO devices 208 to activate at least one of a display 458, a user interface 460, and an audible device 462.

The HWIO devices 408 may include an interface control module 464 and hardware interfaces/drivers 466. The interface control module 464 provides an interface between the ECM 44", the TCM 46", the sensors 406, the GPS 422, the memory 442, and the hardware interfaces/drivers 466. The hardware interfaces/drivers 466 control operation of, for example, the system clock 456, the display 458, the user interface 460, the audible device 462, and other vehicle and/or engine system devices. The other vehicle and/or engine system devices may include, but are not limited to, ignition coils, spark plugs, throttle valves, solenoids, etc. The hardware interface/drivers 466 also receive sensor signals, which are communicated to the respective modules, such as the ECM 44" and the TCM 46".

Figure 5:
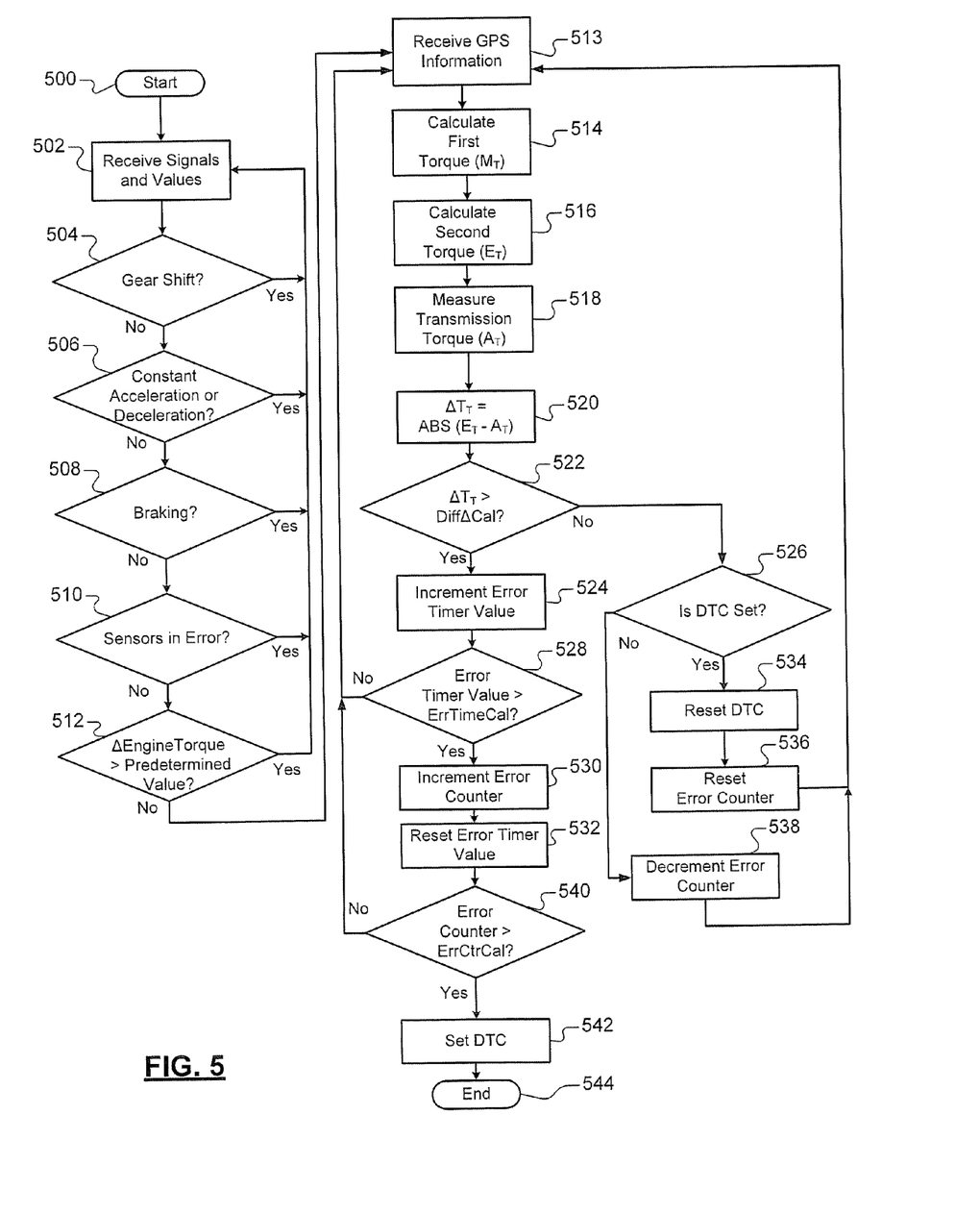
FIG. 5 illustrates a torque sensor diagnostic method that uses a GPS method in accordance with another embodiment of the present disclosure.

Referring now also to FIG. 5, a torque sensor diagnostic method that uses a GPS method is shown. Although the following steps are primarily described with respect to the embodiments of FIGS. 1-4, the steps may be modified to apply to other embodiments of the present invention.

The method may begin at step 500. In step 502, signals from the sensors 406 may be received and/or generated. The signals include a gear position signal, a throttle signal, a brake signal, an engine speed, a DTC signal, and an engine torque change during a predetermined period. The signals may be transmitted to the operation mode module 402 via the HWIO devices 408. In a similar manner to that described above in FIG. 3, the operation mode module 402 determines whether the engine system 10 is operating in one of a transient mode and a non-transient mode based on the signals.

In step 504, when the gear position signal indicates that the transmission 26 is not shifting between two or more gears for a predetermined period, control may proceed to step 506. Otherwise, control may return to step 502. In step 506, when the throttle signal indicates at least one of constant velocity and a consistent acceleration and/or deceleration of a vehicle, control may proceed to step 508. Otherwise, control may return to step 502.

In step 508, when the brake signal indicates that vehicle braking is not applied, control may proceed to step 510. Otherwise, control may return to step 502. In step 510, when the DTC signal indicates that one of the sensors 406 is faulty, control may return to step 502. Otherwise, control may proceed to step 512.

In step 512, when the engine torque change ΔEngineTorque during a predetermined period is greater than a predetermined value, control may return to step 502. Otherwise, control may proceed to step 513. For example, the operation mode module 402 may receive engine torque signals from the engine torque sensor 421 over a predetermined period. Fluctuations may occur in the engine torque signals during the predetermined period due to abrupt throttling or braking. If the engine torque signals indicate a torque variance that is less than a predetermined value, the engine 16 may be operating in a non-transient mode. Alternatively, the operation mode module 402 may receive estimated engine torque signals from the engine torque module 404 based on a mass airflow signal, a fuel amount delivered to cylinders of an engine, and an engine speed. If the estimated engine torque signals indicate a torque variance that is less than a predetermined value, the engine 16 may be operating in a non-transient mode.

In step 513, the operation mode module 402 may generate and transmit an enablement signal to the engine torque module 404. When the engine torque module 404 receives the enablement signal, the engine torque module 404 receives signals from the GPS 422 via the HWIO devices 408. The signals may include at least one of a GPS speed signal, a GPS grade signal, a GPS location signal, a GPS time signal, and a GPS direction signal.

In step 514, the engine torque module 404 may generate a first estimated torque signal $M_T$ based on at least one of a GPS vehicle speed signal, a throttle signal, and a gear ratio of a transmission. The GPS vehicle speed signal may represent vehicle acceleration and be determined based on at least one of a GPS grade signal, a GPS location signal, a GPS time signal, and a GPS direction signal. The first estimated torque signal $M_T$ is transmitted to the torque estimation module 438.

In step 516, the torque estimation module 438 receives the first estimated torque signal $M_T$ from the engine torque module 404 and generates a second estimated torque signal $E_T$. For example only, the second estimated torque signal $E_T$ may be defined as provided in expression 5.

$$E_T = F\{VMass, M_T\} \quad (5)$$

VMass is a total weight of a vehicle and may be determined based on at least one of the calibrated vehicle mass value 444 and the estimated vehicle mass value 446.

In step 518, the torque detection module 436 generates an actual torque signal $A_T$. The torque detection module 436 receives a torque signal from the transmission torque sensor 420 via hardware input/output (HWIO) devices 408 to generate an actual torque signal $A_T$.

In step 520, the diagnostic module 440 compares the second estimated torque signal $E_T$ with the actual torque signal $A_T$. The diagnostic module 440 calculates a torque difference between the second estimated torque signal and the actual torque signal and sets an abstract value of the torque difference as $\Delta T_T$.

In step 522, when the torque difference $\Delta T_T$ is greater than a predetermined value DiffΔCal, control may proceed to step 524 indicating a malfunction of the torque sensor 40. Otherwise, control may proceed to step 526. The predetermined value may, for example, be calibrated and set using the calibration software 448 in the memory 442. The predetermined value DiffΔCal indicates a maximum allowable torque difference between the second estimated torque signal $E_T$ and the actual torque signal $A_T$.

In step 524, the diagnostic module 440 may increase time lasted since the torque difference $\Delta T_T$ is greater than the predetermined value DiffΔCal. For example, the error timer 450 accesses a system clock 456 via the HWIO devices 408 to receive an initial timestamp of when the torque difference $\Delta T_T$ is greater than the predetermined value DiffΔCal. The error timer 450 compares the initial timestamp with a current timestamp, which may also be received from the system clock 456. The difference between the timestamps may be the error timer value 454.

In step 528, when the error timer value 454 is greater than a predetermined period ErrTimeCal, control may proceed to step 530. Otherwise, control may proceed to step 514. The predetermined value may, for example, be calibrated and set using the calibration software 448 in the memory 442. The predetermined value ErrTimeCal indicates a maximum allowable error time during which the torque difference that is greater than the predetermined value DiffΔCal continues. In step 530, the diagnostic module 440 increments an error counter 452 by one. In step 532, the error timer 450 resets the error timer value 454 to zero.

In step 526, when a DTC indicating a fault of the torque sensor 40 is previously set, control may proceed to step 534. Otherwise, control may proceed to step 538. In step 534, the diagnostic module 440 resets the DTC. In step 536, the diagnostic module 440 resets the error counter 452 to zero. In step 538, the diagnostic module 440 decrements the error counter 452 by one.

In step 540, when the error counter 452 is greater than a predetermined value ErrCtrCal, control may proceed to step 542. Otherwise, control may proceed to step 514. The predetermined value may, for example, be calibrated and set using the calibration software 448 in the memory 442. The predetermined value ErrCtrCal indicates a maximum allowable number of errors. In step 542, the diagnostic module 440 sets the DTC. Control may end at step 544.

Figure 6:
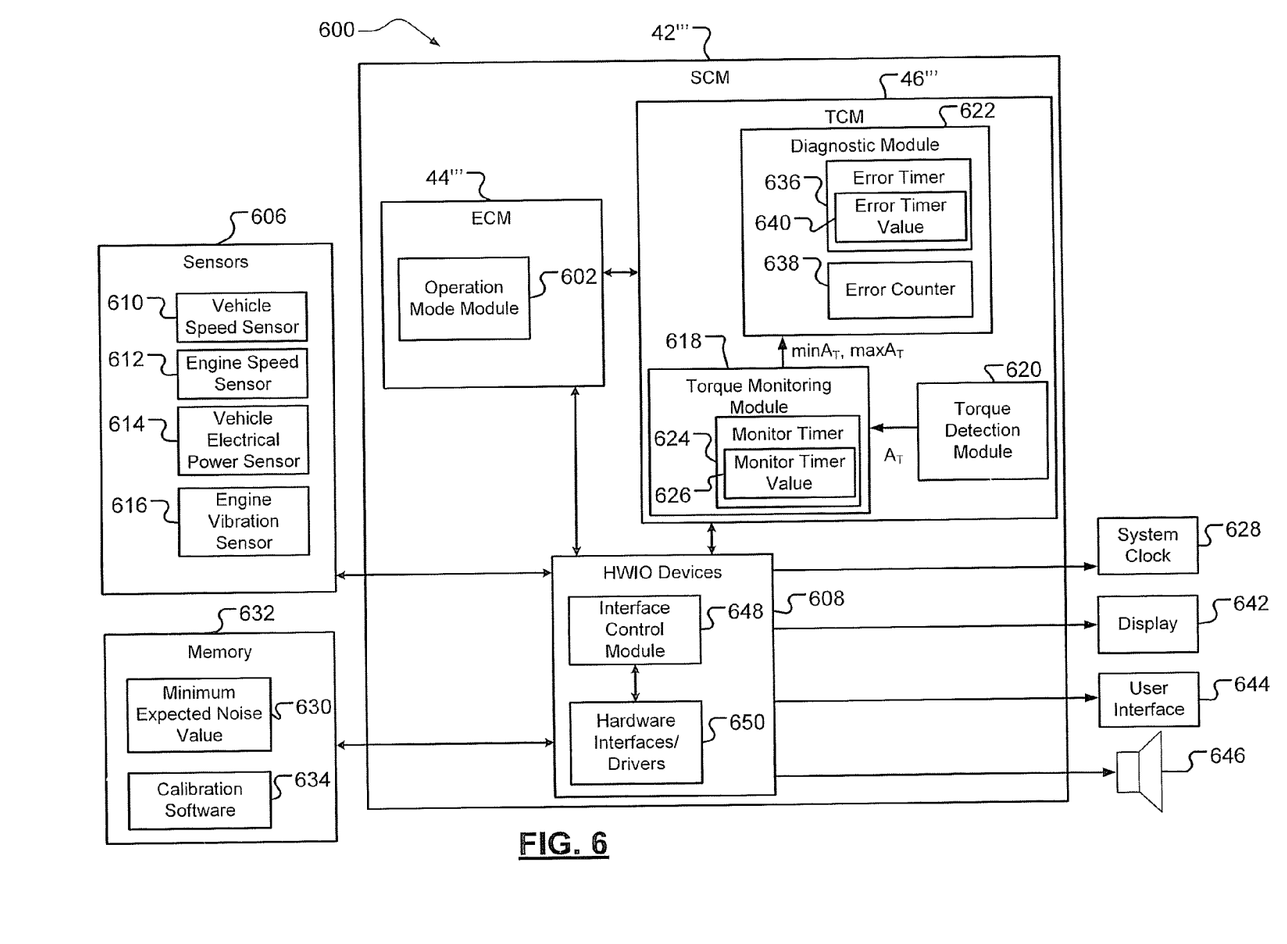
FIG. 6 is a functional block diagram of a torque sensor diagnostic system that uses a vehicle operation method in accordance with another embodiment of the present disclosure.

Referring now also to FIG. 6, a torque sensor diagnostic system 600 that uses a vehicle operation method is shown. The torque sensor diagnostic system 600 includes a SCM 42'''. The SCM 42''' may be used in replacement of the SCM 42 of FIG. 1 and include an ECM 44''' and a TCM 46'''.

In a similar manner to that described above in FIG. 2, the ECM 44''' includes an operation mode module 602. The operation mode module 602 receives signals from sensors 606 via hardware input/output (HWIO) devices 608. The sensors 606 may include sensors shown in FIG. 2, such as a throttle position sensor 210, a mass airflow (MAF) sensor 212, a crankshaft sensor 214, a transmission torque sensor 216, a fuel sensor 218, a brake sensor 220, a gear position sensor 221, and an intake air temperature sensor 222. The sensors 606 may additionally include, but are not limited to, a vehicle speed sensor 610, an engine speed sensor 612, a vehicle electrical power sensor 614, and an engine vibration sensor 616. The operation mode module 602 communicates with the sensors 606 and determines whether the engine 16 is operating in an error mode based on a DTC for the sensors 606. The error mode indicates whether one or more of the sensors 606 are under faulty conditions. The torque sensor diagnostic system 600 may operate both in a transient mode and a non-transient mode as long as the sensors 606 are operating normally.

When the engine 16 is not in the error mode, the operation mode module 602 may generate an enablement signal and transmit the enablement signal to the TCM 46'''. The TCM 46''' includes a torque monitoring module 618, a torque detection module 620, and a diagnostic module 622. The torque monitoring module 618 receives the enablement signal and enables the torque detection module 620. The torque detection module 620 may generate an actual torque signal $A_T$ based on a torque signal received from the transmission torque sensor 216.

The torque detection module 620 may transmit the actual torque signal $A_T$ to the torque monitoring module 618. When the torque monitoring module 618 receives the actual torque signal $A_T$, comparisons are made by the torque monitoring module 618 to generate a first torque signal min$A_T$ based on the actual torque signal $A_T$ that represents a lowest torque value over a predetermined period. When the actual torque signal $A_T$ is less than the first torque signal min$A_T$, the torque monitoring module 618 may set the first torque signal min$A_T$ to the actual torque signal $A_T$.

Similarly, when the torque monitoring module 618 receives the actual torque signal $A_T$, comparisons are made by the torque monitoring module 618 to generate a second torque signal max$A_T$ based on the actual torque signal $A_T$ that represents a highest torque value over a predetermined period. When the actual torque signal $A_T$ is greater than the second torque signal max$A_T$, the torque monitoring module 618 may set the second torque signal max$A_T$ to the actual torque signal $A_T$.

The torque monitoring module 618 includes a monitor timer 624 and a monitor timer value 626. When the comparisons are completed to determine the first torque signal min$A_T$ and the second torque signal max$A_T$, the torque monitoring module 618 increments the monitor timer value 626 of the monitor timer 624. The monitor timer 624 accesses a system clock 628 via the HWIO devices 608 to receive an initial timestamp of, for example, when the actual torque signal $A_T$ is generated by the torque detection module 620. The monitor timer 624 compares the initial timestamp with a current timestamp, which may also be received from the system clock 628. When the difference between the timestamps is greater than a predetermined period, the first torque signal min$A_T$ and the second torque signal max$A_T$ are transmitted to the diagnostic module 622.

The diagnostic module 622 compares a torque difference between the signals min$A_T$, max$A_T$ with a minimum expected noise value 630 stored in memory 632. The minimum expected noise value 630 may be determined based on at least one of a vibration signal received from the engine vibration sensor 616 and electrical noise of the transmission torque sensor 216. The minimum expected noise value 630 may be calibrated by the diagnostic module 622 using calibration software 634.

The diagnostic module 622 includes an error timer 636 and an error counter 638. The error timer 636 accesses the system clock 628 via the HWIO devices 608 to receive an initial timestamp of, for example, when the torque difference between the signals $minA_T$, $maxA_T$ is less than or equal to the minimum expected noise value 630. Conversely, when the torque difference between the signals $minA_T$, $maxA_T$ is greater than the minimum expected noise value 630, the diagnostic module 622 further compares the torque difference with a sum of the minimum expected noise value 630 and a hysteresis threshold. The hysteresis threshold is calibrated and set by the diagnostic module 622 using the calibration software 634. The error timer 636 accesses the system clock 628 via the HWIO devices 608 to receive an initial timestamp of, for example, when the torque difference between the signals $minA_T$, $maxA_T$ is greater than the sum of the minimum expected noise value 630 and the hysteresis threshold. The error timer 636 compares the initial timestamp with a current timestamp, which may also be received from the system clock 628.

The diagnostic module 622 increases an error timer value 640 based on a difference between the timestamps. When the error timer value 640 is greater than a predetermined period, the error counter 638 may be incremented by one based on the error timer value 640. When the error counter 638 is greater than a predetermined value, the diagnostic module 622 generates and transmits an error code signal to the HWIO devices 608 to activate at least one of a display 642, a user interface 644, and an audible device 646.

The HWIO devices 608 may include an interface control module 648 and hardware interfaces/drivers 650. The interface control module 648 provides an interface between the ECM 44''', the TCM 46''', the sensors 606, the memory 632, and the hardware interfaces/drivers 650. The hardware interfaces/drivers 650 control operation of, for example, the system clock 628, the display 642, the user interface 644, the audible device 646, and other vehicle and/or engine system devices. The other vehicle and/or engine system devices may include, but are not limited to, ignition coils, spark plugs, throttle valves, solenoids, etc. The hardware interface/drivers 650 also receive sensor signals, which are communicated to the respective modules, such as the ECM 44''' and the TCM 46'''.

Figure 7:
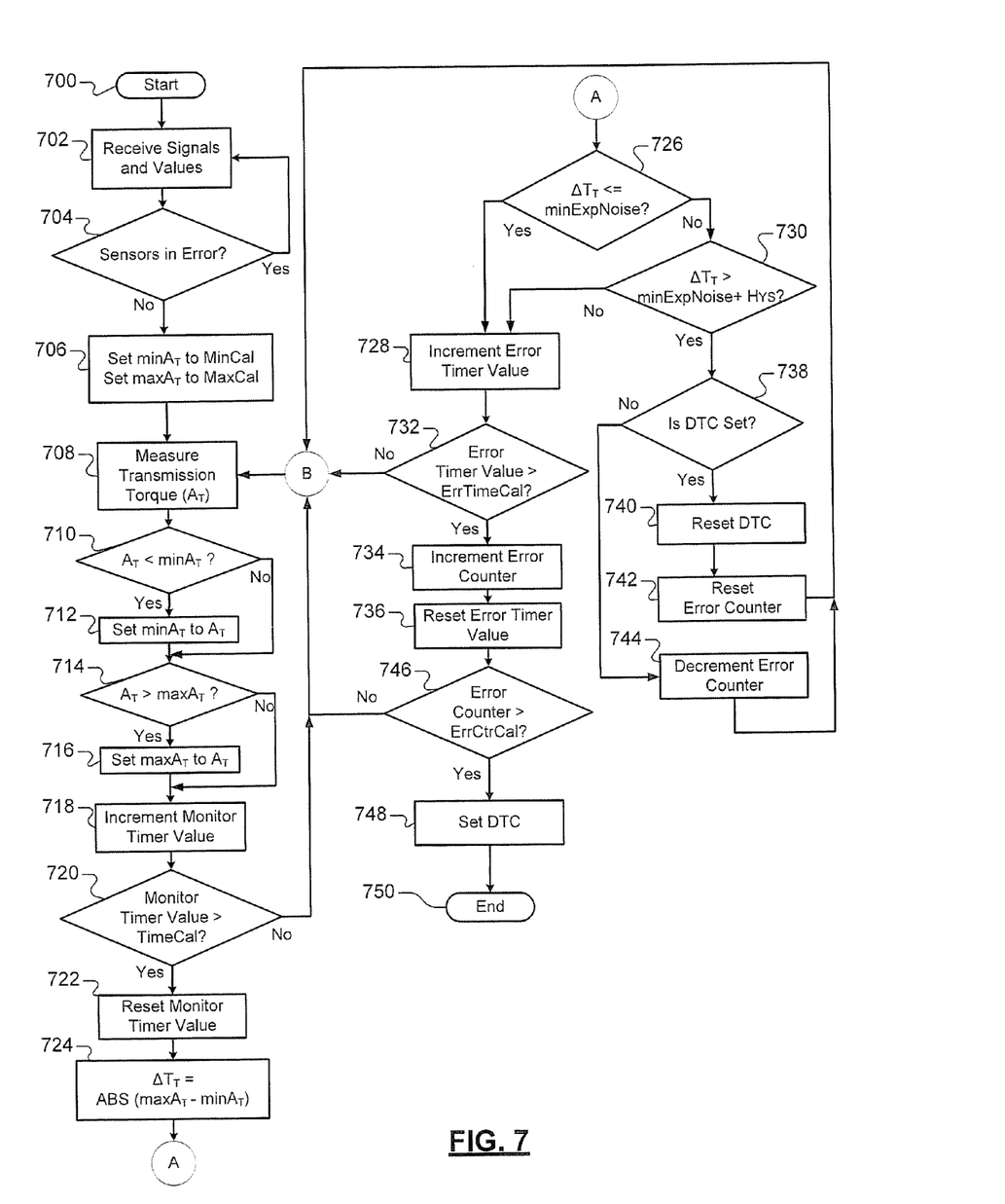
FIG. 7 illustrates a torque sensor diagnostic method that uses a vehicle operation method in accordance with another embodiment of the present disclosure.

Referring now also to FIG. 7, a torque sensor diagnostic method that uses a vehicle operation method is shown. Although the following steps are primarily described with respect to the embodiments of FIGS. 1-6, the steps may be modified to apply to other embodiments of the present invention.

The method may begin at step 700. In step 702, signals from the sensors 606 may be received and/or generated. The signals may include, but are not limited to, a gear position signal, an engine torque signal, a throttle signal, a brake signal, a DTC signal, a vehicle speed signal, an engine speed, and an engine vibration signal. The signals may be transmitted to the operation mode module 602 via the HWIO devices 608.

In step 704, when the DTC signal indicates that one of the sensors 606 is faulty, control may return to step 702. Otherwise, control may proceed to step 706. In step 706, the operation mode module 602 may generate an enablement signal and transmit the enablement signal to the torque monitoring module 618. The torque monitoring module 618 receives the enablement signal and sets a first torque signal $minA_T$ and a second torque signal $maxA_T$ to predetermined values MinCal, MaxCal respectively.

In step 708, the torque monitoring module 618 enables the torque detection module 620. The torque detection module 620 generates an actual torque signal $A_T$. The torque detection module 620 receives a torque signal from the transmission torque sensor 216 via hardware input/output (HWIO) devices 608 to generate the actual torque signal $A_T$.

In step 710, the torque monitoring module 618 compares the the actual torque signal $A_T$ with the first torque signal $minA_T$. When the actual torque signal $A_T$ is less than the first torque signal $minA_T$, control may proceed to step 712. Otherwise, control may proceed to step 714.

In step 712, the torque monitoring module 618 sets the first torque signal $minA_T$ to the actual torque signal $A_T$. In step 714, the torque monitoring module 618 compares the the actual torque signal $A_T$ with the second torque signal $maxA_T$. When the actual torque signal $A_T$ is greater than the second torque signal $maxA_T$, control may proceed to step 716. Otherwise, control may proceed to step 718.

In step 716, the torque monitoring module 618 sets the second torque signal $maxA_T$ to the actual torque signal $A_T$. In step 718, the torque monitoring module 618 increments the monitor timer value 626 of the monitor timer 624. In step 720, when the monitor timer value 626 is greater than a predetermined value TimeCal, control may proceed to step 722. Otherwise, control may proceed to step 708. In step 722, the torque monitoring module 618 resets the monitor timer value 626 to zero. In step 724, the torque monitoring module 618 transmits the first torque signal $minA_T$ and the second torque signal $maxA_T$ to the diagnostic module 622. The diagnostic module 622 calculates a torque difference between the first torque signal $minA_T$ and the second torque signal $maxA_T$ and sets an abstract value of the torque difference as $\Delta T_T$.

In step 726, when the torque difference $\Delta T_T$ is less than or equal to a minimum expected noise value minExpNoise, control may proceed to step 728 indicating a malfunction of the torque sensor 40. Otherwise, control may proceed to step 730. The minimum expected noise value minExpNoise may, for example, be determined by detecting vibrations in the engine structure and a passage of resonant frequencies caused by a rough road condition. The minimum expected noise value minExpNoise may, for example, be calibrated and set using the calibration software 634 in the memory 632. The minimum expected noise value minExpNoise indicates a minimum torque difference expected between the first torque signal $minA_T$ and the second torque signal $maxA_T$ under a predetermined condition.

The predetermined condition may, for example, be determined based on an engine vibration signal received from the engine vibration sensor 616 (e.g. accelerometer), indicating a rough road condition. Under the rough road condition, a predetermined torque fluctuation is expected during a predetermined period. A torque fluctuation (e.g. $\Delta T_T$) that is not greater than the minimum expected noise value minExpNoise is a problem to be analyzed. The diagnostic module 622 may expect at least a minimum amount of torque difference between the first torque signal $minA_T$ and the second torque signal $maxA_T$. If the difference between the signals $minA_T$, $maxA_T$ does not exceed the minimum expected noise value minExpNoise, the torque sensor 40 is in a faulty condition.

In step 728, the diagnostic module 622 may increase time lasted since the torque difference $\Delta T_T$ is less than or equal to the minimum expected noise value minExpNoise. For example, the error timer 636 accesses a system clock 628 via the HWIO devices 608 to receive an initial timestamp of when the torque difference $\Delta T_T$ is less than or equal to the minimum expected noise value minExpNoise. The error timer 636 compares the initial timestamp with a current timestamp, which may also be received from the system clock 628. The difference between the timestamps may be the error timer value 640.

In step 732, when the error timer value 640 is greater than a predetermined period ErrTimeCal, control may proceed to step 734. Otherwise, control may proceed to step 708. The predetermined value may, for example, be calibrated and set using the calibration software 634 in the memory 632. The predetermined value ErrTimeCal indicates a maximum allowable error time in which the torque difference $\Delta T_T$ that is less than or equal to the minimum expected noise value minExpNoise may persist. In step 734, the diagnostic module 622 increments an error counter 638 by one. In step 736, the error timer 636 resets the error timer value 640 to zero.

In step 730, when the torque difference $\Delta T_T$ is greater than a sum of the minimum expected noise value minExpNoise and a hysteresis threshold HYS, control may proceed to step 738. Otherwise, control may proceed to step 728.

Figure 8:
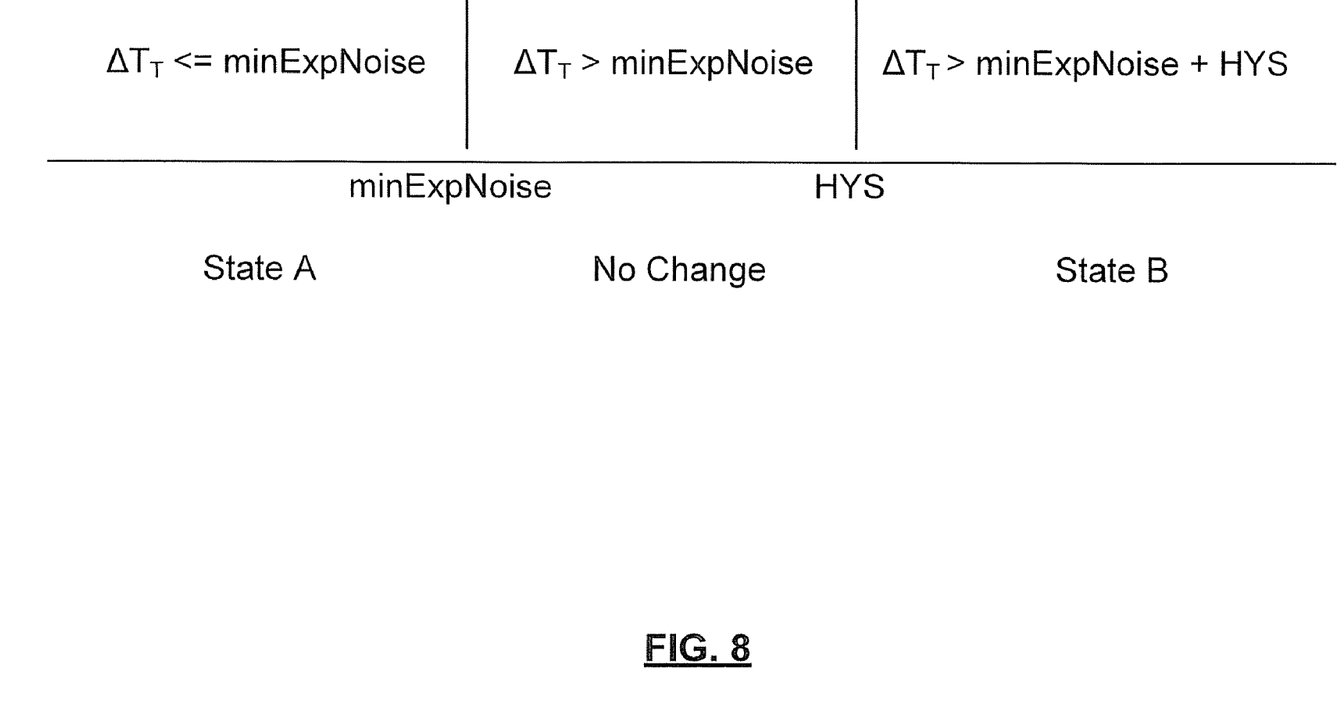
FIG. 8 illustrates a hysteresis function that is used in the torque sensor diagnostic method of FIG. 7 in accordance with an embodiment of the present disclosure.

For example, referring now also to FIG. 8, a hysteresis function that is used in the torque sensor diagnostic method of FIG. 7 is shown. When the torque difference $\Delta T_T$ is less than or equal to the minimum expected noise value minExpNoise, the diagnostic module 622 is in a first state (State A). When the torque difference $\Delta T_T$ is greater than the minimum expected noise value minExpNoise, the diagnostic module 622 is not in a second state (State B) until the torque difference $\Delta T_T$ exceeds the sum of the minimum expected noise value minExpNoise and the hysteresis threshold HYS. Therefore, the hysteresis threshold HYS provides a null period between the first state (State A) and the second state (State B).

When the diagnostic module 622 is in the second state (State B), the diagnostic module 622 at least one of resets and decrements the error counter 638 based on a DTC signal for the sensors 606. When the diagnostic module 622 is in the first state (State A), the diagnostic module 622 increments the error timer value 640 of the error timer 636.

Although the hysteresis function for the torque sensor diagnostic method of FIG. 7 is described independently from other embodiments of the present disclosure, the hysteresis function may be incorporated into the other embodiments of the present disclosure, such as the torque sensor diagnostic methods that use a model method and/or a GPS method.

Referring now again to FIG. 7, in step 738, when a DTC indicating a fault of the torque sensor 40 is previously set, control may proceed to step 740. Otherwise, control may proceed to step 744. In step 740, the diagnostic module 622 resets the DTC. In step 742, the diagnostic module 622 resets the error counter 638 to zero. In step 744, the diagnostic module 622 decrements the error counter 638 by one.

In step 746, when the error counter 638 is greater than a predetermined value ErrCtrCal, control may proceed to step 748. Otherwise, control may proceed to step 708. The predetermined value may, for example, be calibrated and set using the calibration software 634 in the memory 632. The predetermined value ErrCtrCal indicates a maximum allowable number of errors. In step 748, the diagnostic module 622 sets the DTC. Control may end at step 750.

The above-described steps are meant to be illustrative examples; the steps may be performed sequentially, synchronously, simultaneously, continuously, during overlapping time periods or in a different order depending upon the application.

Furthermore, although the three embodiments of the present invention, the torque sensor diagnostic systems 200, 400, 600, are described separately with respect to the exemplary engine system 10, the embodiments of the present disclosure may be combined into one system or may be distributed into distinct systems. For example, the torque sensor diagnostic system 200 that uses a model method and the torque sensor diagnostic system 400 that uses a GPS method may be combined together into one system. When the engine torque module 204 of the ECM 44' fails to generate a first estimated torque signal due to a fault of one of the sensors 206, the engine torque module 404 of the ECM 44" may generate the first estimated torque signal based on signals received from the GPS sensors 424.

Moreover, even if none of the sensors 206 is in a faulty condition, both diagnostic systems 200, 400 may be operating in tandem to verify outputs generated from both systems 200, 400. For example, when a DTC is generated by the diagnostic system 200, the diagnostic system 400 may perform a separate diagnostic in accordance with the diagnostic method shown in FIG. 5. If the output of the diagnostic system 400 is the same as the output of the diagnostic system 200, the diagnostic system 400 may set a DTC as generated by the diagnostic system 200. If not, the diagnostic system 400 may not set the DTC as generated by the diagnostic system 200.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A diagnostic system comprising:
   an engine torque module that generates a first estimated torque signal based on a mass airflow signal, a fuel amount delivered to cylinders of an engine, and an engine speed;
   a torque detection module that generates an actual torque signal based on a torque signal received from a torque sensor that indicates an actual output torque of a transmission;
   a torque estimation module that generates a second estimated torque signal independent of the actual torque signal, wherein the second estimated torque signal is generated based on the first estimated torque signal, a transmission gain value, a transmission loss value, and a transmission offset value; and
   a diagnostic module that detects a fault of the torque sensor based on a torque difference between the actual torque signal and the second estimated torque signal.

2. The diagnostic system of claim 1 wherein the torque estimation module determines the transmission gain value based on at least one of a torque converter multiplication value and a gear ratio of the transmission,
   wherein the torque estimation module determines the transmission loss value based on at least one of a clutch loss value and a pump loss value of the transmission, and
   wherein the torque estimation module determines the transmission offset value based on at least one of a voltage and current variation, an amount of magnetic leakage of the torque sensor, and an electrical noise value of the torque sensor.

3. The diagnostic system of claim 2 wherein the torque converter multiplication value is determined based on at least one of a torque converter constant and a speed ratio between the engine speed and an input speed of the transmission, wherein the clutch loss value is determined based on at least one of a spinning speed of a clutch, a type of the clutch, and a pressure of the clutch, wherein the pump loss value is determined based on at least one of the engine speed, an engine load, and a gear position signal, wherein the torque converter constant is determined based on the engine speed and at least one of engine torque and transmission torque.

4. The diagnostic system of claim 1 further comprising an error timer that measures a time difference between a current timestamp and an initial timestamp when the torque difference between the actual torque signal and the second estimated torque signal is greater than a first predetermined value, wherein the diagnostic module increments an error timer value based on the fault and the time difference.

5. The diagnostic system of claim 4 wherein the diagnostic module increments an error counter when the error timer value is greater than a first predetermined period, wherein the diagnostic module sets an error code when the error counter is greater than a second predetermined value, and wherein the diagnostic module at least one of resets the error counter and decrements the error counter when the torque difference is less than or equal to the first predetermined value.

6. The diagnostic system of claim 1 further comprising an operation mode module that determines that the engine is operating in one of a transient mode and a non-transient mode based on engine parameters, wherein the operation mode module enables the engine torque module based on engine operation in the one of the transient mode and the non-transient mode.

7. The diagnostic system of claim 6 wherein the engine parameters include at least one of a gear position signal, a brake signal, an engine speed signal, and an engine torque change during a second predetermined period.

8. A diagnostic system comprising:
an engine torque module that generates a first estimated torque signal based on a global positioning system (GPS) vehicle speed signal, a throttle signal, and a gear ratio of a transmission;
a torque detection module that generates an actual torque signal based on a torque signal received from a torque sensor that indicates an actual output torque of the transmission;
a torque estimation module that generates a second estimated torque signal independent of the actual torque signal, wherein the second estimated torque signal is generated based on the first estimated torque signal and an estimated vehicle mass value; and
a diagnostic module that detects a fault of the torque sensor based on a torque difference between the actual torque signal and the second estimated torque signal.

9. The diagnostic system of claim 8 wherein the GPS vehicle speed signal is generated based on at least one of a GPS grade signal, a GPS location signal, a GPS time signal, and a GPS direction signal.

10. The diagnostic system of claim 8 wherein the estimated vehicle mass value is determined based on at least one of a seat sensor signal, a trunk sensor signal, a towing sensor signal, and a calibrated vehicle mass value.

11. The diagnostic system of claim 8 further comprising an error timer that measures a time difference between a current timestamp and an initial timestamp when the torque difference between the actual torque signal and the second estimated torque signal is greater than a first predetermined value, wherein the diagnostic module increments an error timer value based on the fault and the time difference.

12. The diagnostic system of claim 11 wherein the diagnostic module increments an error counter when the error timer value is greater than a first predetermined period, wherein the diagnostic module sets an error code when the error counter is greater than a second predetermined value, and wherein the diagnostic module at least one of resets the error counter and decrements the error counter when the torque difference is less than or equal to the first predetermined value.

13. The diagnostic system of claim 8 further comprising an operation mode module that determines that the engine is operating in one of a transient mode and a non-transient mode based on engine parameters, wherein the operation mode module enables the engine torque module based on engine operation in the one of the transient mode and the non-transient mode.

14. The diagnostic system of claim 13 wherein the engine parameters include at least one of a gear position signal, a brake signal, an engine speed signal, and an engine torque change during a second predetermined period.

15. A diagnostic system comprising:
a torque detection module that generates an actual torque signal based on a torque signal received from a torque sensor that indicates an actual output torque of a transmission;
a torque monitoring module that generates a first torque signal based on the actual torque signal that represents a lowest torque value over a first predetermined period, wherein the torque monitoring module generates a second torque signal based on the actual torque signal that represents a highest torque value over the first predetermined period; and
a diagnostic module that detects a fault of the torque sensor based on a minimum expected noise value and a torque difference between the first torque signal and the second torque signal.

16. The diagnostic system of claim 15 further comprising memory that stores the minimum expected noise value, wherein the minimum expected noise value is determined based on at least one of a vibration signal of an engine vibration sensor and an electrical noise value of the torque sensor.

17. The diagnostic system of claim 15 further comprising an error timer that measures a time difference between a current timestamp and an initial timestamp when the torque difference between the first torque signal and the second torque signal is less than or equal to the minimum expected noise value, wherein the diagnostic module increments an error timer value based on the fault and the time difference.

18. The diagnostic system of claim 17 wherein the diagnostic module increments an error counter when the error timer value is greater than a second predetermined period, wherein the diagnostic module sets an error code when the error counter is greater than a first predetermined value, and wherein the diagnostic module at least one of resets the error counter and decrements the error counter when the torque difference is greater than the minimum expected noise value.

19. The diagnostic system of claim 18 wherein the diagnostic module provides a lag period during which the diagnostic module delays at least one of incrementing the error timer value and adjusting the error counter based on a predetermined threshold.

20. The diagnostic system of claim 15 further comprising an operation mode module that determines that an engine is operating in an error mode based on a diagnostic trouble code associated with at least one of a vehicle speed sensor, an engine speed sensor, a vehicle electrical power sensor, and an engine vibration sensor, wherein the operation mode module enables the torque monitoring module based on engine operation in the error mode.

* * * * *